United States Patent
Barajas Gonzalez et al.

(10) Patent No.: US 10,831,410 B2
(45) Date of Patent: Nov. 10, 2020

(54) MANAGING MAINTENANCE OF TAPE STORAGE SYSTEMS

(71) Applicant: International Business Machines Corporation, Armonk, NY (US)

(72) Inventors: Emmanuel Barajas Gonzalez, Guadalajara (MX); Shaun E. Harrington, Sahuarita, AZ (US); Benjamin K. Rawlins, Tucson, AZ (US); Jason E. Willerup, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 15/297,294

(22) Filed: Oct. 19, 2016

(65) Prior Publication Data

US 2018/0107410 A1 Apr. 19, 2018

(51) Int. Cl.
G06F 3/06 (2006.01)
(52) U.S. Cl.
CPC .............. *G06F 3/067* (2013.01); *G06F 3/061* (2013.01); *G06F 3/0614* (2013.01); *G06F 3/0629* (2013.01); *G06F 3/0638* (2013.01); *G06F 3/0653* (2013.01)
(58) Field of Classification Search
CPC ......... G06F 3/0619; G06F 3/065; G06F 3/067
See application file for complete search history.

(56) References Cited

U.S. PATENT DOCUMENTS

| | | | |
|---|---|---|---|
| 6,295,591 B1 | 9/2001 | Bealkowski et al. | |
| 6,651,062 B2 | 11/2003 | Ghannam et al. | |
| 7,293,133 B1* | 11/2007 | Colgrove | G06F 3/0608 711/111 |
| 8,406,096 B1 | 3/2013 | Edling et al. | |
| 9,020,921 B2 | 4/2015 | Alber et al. | |
| 2001/0032109 A1 | 10/2001 | Gonyea et al. | |
| 2005/0052772 A1* | 3/2005 | Barbian | G11B 27/002 360/69 |
| 2009/0055684 A1* | 2/2009 | Jamjoom | G06F 11/0709 714/26 |
| 2011/0213636 A1 | 9/2011 | Sakuma | |

(Continued)

OTHER PUBLICATIONS

List of IBM Patents or Patent Applications Treated as Related, Appendix P, Filed Herewith.
(Continued)

*Primary Examiner* — Larry T Mackall
*Assistant Examiner* — Michelle T Bechtold
(74) *Attorney, Agent, or Firm* — Daniel R. Simek

(57) ABSTRACT

A method for managing a storage system. The method includes one or more computer processors receiving a first set of data associated with a storage system. The method further includes determining whether to service the storage system based on utilizing one or more models associated with the storage system to analyze the first set of data. In response determining to service the storage system, the method further includes generating a set of notifications based, at least in part, on information from the one or more models associated with the storage system analyzing the first set of data. The method further includes initiating a preservice activity associated the storage system based, at least in part, on information within the set of notifications.

14 Claims, 5 Drawing Sheets

(56) References Cited

U.S. PATENT DOCUMENTS

| | | | |
|---|---|---|---|
| 2012/0173300 A1* | 7/2012 | Davenport | G06Q 10/063 |
| | | | 705/7.28 |
| 2013/0083639 A1 | 4/2013 | Wharton et al. | |
| 2013/0191588 A1 | 7/2013 | Starr | |
| 2013/0238382 A1 | 9/2013 | Schierholt et al. | |
| 2014/0055880 A1 | 2/2014 | Jhatakia et al. | |
| 2014/0146648 A1 | 5/2014 | Alber et al. | |
| 2014/0258539 A1* | 9/2014 | Heninger | G06F 9/5083 |
| | | | 709/226 |
| 2017/0302540 A1* | 10/2017 | Monahan | H04L 41/5074 |

OTHER PUBLICATIONS

Emmanuel Barajas Gonzalez, et al., "Managing Maintenance of Tape Storage Systems", U.S. Appl. No. 15/889,282, filed Feb. 6, 2018.

* cited by examiner

MANAGING MAINTENANCE OF TAPE STORAGE SYSTEMS

BACKGROUND OF THE INVENTION

The present invention relates generally to the field of computer storage systems, and more particularly with supporting and servicing magnetic tape library systems.

Advances in information technology (IT) enable individuals, organizations, enterprises, and agencies to access and process ever-increasing volumes of stored information. Not all data is utilized within a short period of time of its generation. Historical electronic data, some of which is unstructured data, may need to be stored for weeks, months, or even years between usages. In addition, various regulatory and compliance requirements dictate that data is stored for extended periods of time. Hard disk drives (HDDs) and flash-memory drives are high-performance data storage devices but are not cost effective for long-term storage within an enterprise or cloud computing environment. Magnetic tapes within a tape storage system are a solution for large data storage and long-term data storage within an information lifecycle management process. Magnetic tape storage systems are a cost effective solution and that can also be utilized for archival data storage and data storage for the purpose of disaster recovery.

Some large tape storage systems are magnetic tape libraries that can have multiple interconnected tape storage system and house 100K+ tape cartridges and store over one exabyte of data. Magnetic tape libraries are automated, complex mechanical systems that retrieve tape cartridges and transport tape cartridges for a plurality of storage locations to devices that read and write electronic data from and to the tape cartridges. Components, such as motors, belts, cables, grippers, etc. are subject to wear, have finite lifespans and require eventual replacement. However, the demands of enterprises, data centers, and other entities that utilize digital data require near 100% online availability. The companies that own tape storage systems or service tape storage systems utilize various methods to minimize the downtime of a tape storage system while controlling the costs of parts and service for the tape storage system. In addition, some customers dictate a number of replications (e.g., 3×) of data that is stored within a tape storage system, and customers may further dictate that the data replications are stored within tape storage systems that are in different geographic locations.

SUMMARY

According to embodiments of the present invention, a method, a computer program product, and a computer system are disclosed for managing a storage system. In an embodiment, the method includes one or more computer processors receiving a first set of data associated with a storage system. The method further includes determining whether to service the storage system based on utilizing one or more models associated with the storage system to analyze the first set of data. In response determining to service the storage system, the method further includes generating a set of notifications based, at least in part, on information from the one or more models associated with the storage system analyzing the first set of data. The method further includes initiating a pre-service activity associated the storage system based, at least in part, on information within of the set of notifications.

DETAILED DESCRIPTION

Figure 1:
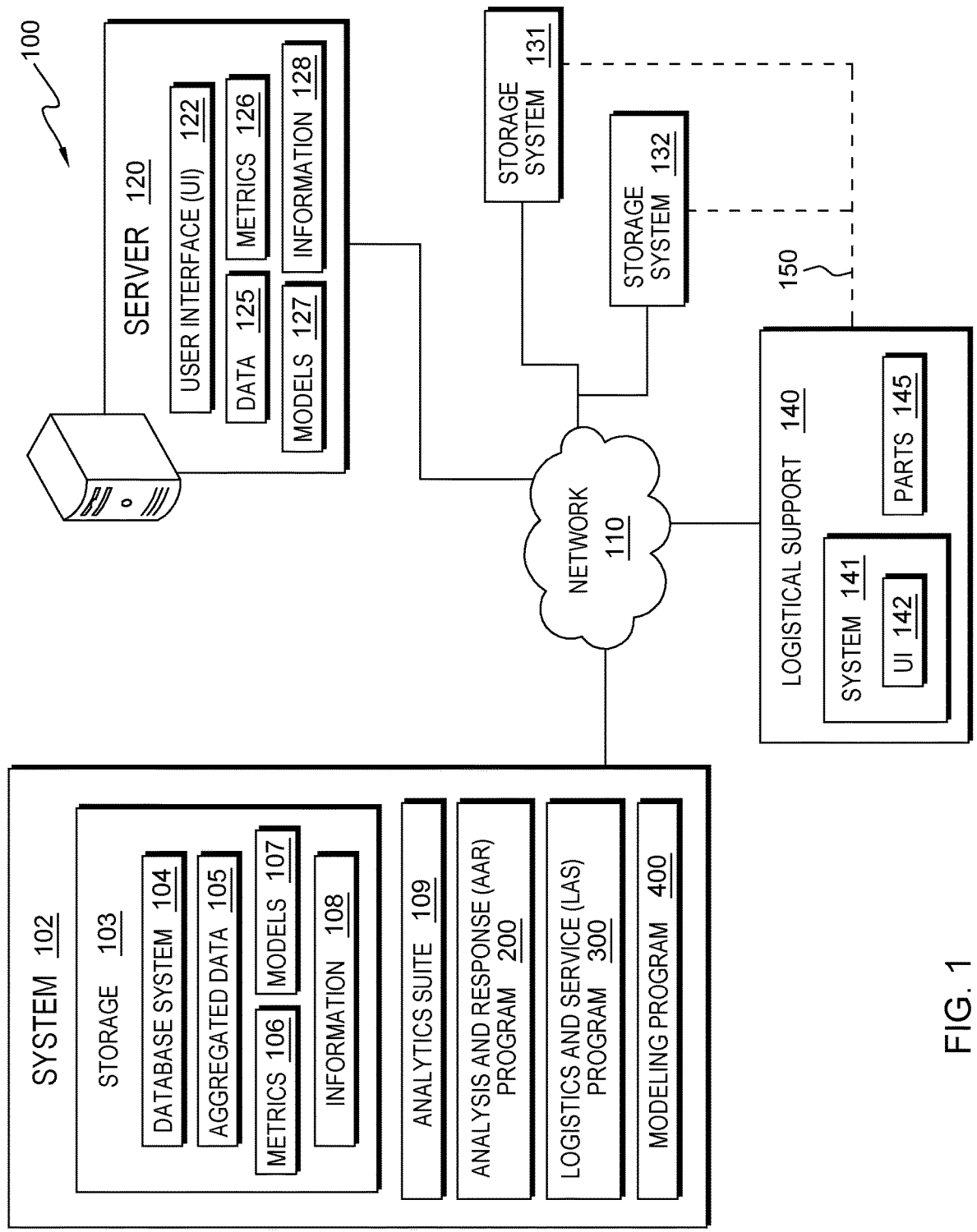
FIG. 1 illustrates a distributed computing environment that includes various physical aspects, in accordance with an embodiment of the present invention.

Embodiments of the present invention recognize that preventive maintenance of tape storage systems may not generate the most cost effective solutions by servicing a tape storage system and replacing components of the tape storage system based on time or feedback from a customer. Unnecessary service to a tape storage system generates unnecessary downtime for the tape storage system. However, tape storage systems exposed to different operational and environmental factors may require service at different rates; in addition, the performance of components of various tape storage systems may be from different lots of parts and/or suppliers. These types of variables are often not accounted for within a preventive maintenance plan and can cause unplanned failures and associated downtime for a tape storage system, which in turn can impact businesses and negatively affect customer satisfaction. In addition, maintaining a large inventory of parts and relying on premium transportation services to deliver parts in response to a repair of a tape storage system incurs added logistical and cost impacts.

Embodiments of the present invention also recognize that predictive maintenance provides an organization that maintains a plurality of tape storage system, herein referred to as storage systems, and the owners (e.g., administrators, data centers, etc.) of storage systems, an enhanced method to maintain and service the storage systems. Predictive maintenance can analyze historical data associated with various storage systems and proactively schedule service and replace parts within a storage system. Some predictive maintenance systems incorporate modeling with the analytics used to predict service for a storage system.

Embodiments of the present invention utilize prescriptive analytics and predictive maintenance models in addition to predictive analytics to determine: a condition of a storage system and to determine the probability, necessity, scheduling, and an estimated cost of service (i.e., maintenance) for a storage system. Embodiments of the present invention include a plurality of factors within the analytics and the predictive models; herein referred to as models, of a storage system. The plurality of factors may include: operational factors, environmental factors, repair histories of each storage system, root-cause analysis associated with service, and user expectations (e.g., cost, response time, repair time, storage system availability, etc.). Embodiments of the present invention utilize near real-time data, periodic data, and historical data as inputs to the predictive analytics and models. In addition, embodiments of the present invention also include various logistical considerations and/or constraints, such as an availability of repair parts, locations of part depots, weather conditions, transportation modes, delivery services, schedules of service representatives, hours of operations of a data center, etc.

Embodiments of the present invention utilize a variety of models to predict service of a storage system. Some models encompass predictive service for all deployed instances of a type and/or configuration of a storage system, whereas other models are optimized for individual instances of a storage system. Various embodiments of the present invention include various ancillary models and sub-models within a model associated with a storage system such that updating a sub-model automatically allows access to the update without modifying each model associated with various storage systems. Models include thresholds and trigger values that can be manually and/or automatically updated to improve the efficiency of predictions. Other embodiments of the present invention utilize sub-models or other models not tied to a specific storage system to predict various aspects of service, such as key contributors to the deterioration of parts, estimate durations of service, determining the placement and quantities of service items, costs/risk of combining scheduled/predicted maintenance as opposed to separate service calls.

Embodiments of the present invention can update and evolve models associated with a storage system as more data is aggregated (e.g., pooled), and/or new data/relationships are identified that is not utilized within the scope of one or more current models associated with a storage system. In addition to predicting service based on known information and/or current conditions of a storage system, some embodiments of the present invention suggest options for decisions that leverage a future opportunity, mitigate a future risk, and/or identify the implication (e.g., cause and effect relationships) of each decision option for a storage system.

Further embodiments of the present invention base one or more models associated with a storage system on a graph structure and analyses of data of the storage system are analyzed via a graph workload that outputs: warnings; predictions of service for the storage system; various notifications associated with the predictions of service; adjustments to a storage system to reduce the probability of service, or delay a predicted service; etc. A graph workload can be defined as queries and/or analytics represented by a graph structure and data, used for data processing. Graph workloads and graph databases are useful for storing, traversing, and processing highly complex relationships. Graph workloads and graph databases can improve intelligence, predictive analytics, and decisions of process management (e.g., equipment service).

In one example, a model (e.g., based on a graph workload) of a storage system is comprised of a plurality of nodes (i.e., vertices) linked by a plurality of edges. Each node or vertex represents an ancillary model, a sub-model, or a data resource, such as raw sensor data, repair histories, service notes, root-cause analysis information, system logs, a list of parts for a storage system, customer metrics, etc.; and/or computational resources, such as a statistical function or a parser to extract information from a system log. In addition, each node may include one or more attributes (e.g., key-value pairs), labels that can contextualize the node, and metadata that can index and/or constrain the node. Nodes are linked by edges that represent relationships or edge values. Relationships may be identified by symbolic labels, such as "included within," "manufactured by," "failure mode," "caused by," etc.; a direction (e.g., a start node and an end node); and/or a quantitative relationship, such as temperature, a rate of wear, usage duration, etc. A relationship can be further quantified by a determined weight factor (WF) derived from metadata related to an edge. Some metadata associated with a graph workload is variable which, for example, can change over time, such as an increasing rate of wear. A WF of a node or an edge may vary in response to changes within a data processing environment. In another example, corrosion increases as humidity exceeds a level within a storage system; alternatively, particulates and static-based damage increase with low humidity levels within a storage system. Other metadata and constraints associated with a graph workload are defined based on metrics of a customer, such as constraining a cost of service, a time of repair (e.g., travel time of service rep/parts and duration of repair), location and availability of parts, etc.

Some embodiments of the present invention utilize input from engineers and/or service representatives to update and improve models associated with a storage system. Other embodiments of the present invention automatically update/evolve models associated with a storage system. In one example, an embodiment of the present invention analyzes data from a plurality of storage systems and automatically adjusts the metadata WF of various relationships to improve the accuracy of a model created by an engineer. In another example, an embodiment of the present invention utilizes various offline analyses, inferential reasoning, and/or simulations to discover one or more new relationships or interactions; and evolves a model associated with a storage system to incorporate the new relationships/interactions within a new model. In addition, one or more discovered relationships may also be included in an offline model associated with a different storage system and verified against historical data of the different storage system to determine whether the discovered relationship is applicable to more than one model associated with storage system.

Further, one skilled in the art would recognize that by including various pre-service activities, both automated and as dictated by information within a set of notifications, generated by models associated with a storage system an administrator of the storage system can reduce or eliminate some impacts of a prediction of service for a storage system. In addition, utilizing models and analytics associated with a storage system and the components of the storage system as graph structures and graph workloads can automate updating models by modifying metadata. Also, by utilizing models based on graph structures, analytics are utilized to discover new relationships and/or interactions that can evolve/improve models associated with prescriptive maintenance of a storage system. As such, the functioning and service (i.e., maintenance) of such a storage system is seen to be improved in at least these aspects.

The present invention will now be described in detail with reference to the Figures. FIG. 1 is a functional block diagram illustrating distributed computing environment 100 in an embodiment, in accordance with the present invention. In an embodiment, distributed computing environment 100 includes: system 102, server 120, storage system 131, storage system 132, and system 141 of logistical support 140 all interconnected over network 110. Many modifications to the depicted environment may be made by those skilled in the art without departing from the scope of the invention as recited by the claims. In some embodiments, portions of distributed computing environment 100 are representative of: hardware resources, software resources, physical assets, and/or personnel resources of one location of a data processing environment (e.g., a data center). In other embodiments, portions of distributed computing environment 100 represents hardware resources, software resources, physical assets, and/or personnel resources distributed among various locations, including at least one data processing environment. In various embodiments, distributed computing environment 100 includes multiple instances of server 120, storage system 131, storage system 132, and logistical support 140, distributed among two or more physical locations. Some physical locations may not include an instance of logistical support 140. Other physical locations may only include logistical support 140, such as a service depot or parts warehouse. In an embodiment, interactions 150 are represented by dashed-lines within distributed computing environment 100.

System 102, server 120, and system 141 can be: laptop computers, tablet computers, netbook computers, personal computers (PC), desktop computers, or any programmable computer systems known in the art. In certain embodiments, system 102, server 120, and system 141 represent computer systems utilizing clustered computers and components (e.g., database server computers, application server computers, etc.) that act as a single pool of seamless resources when accessed through network 110, as is common in data centers and with cloud-computing applications. Storage system 131 and storage system 132 are storage systems that are utilized for: data backup, online archival storage, tertiary storage within tiered storage solution, long term data storage, and/or disaster recovery. In general, system 102, server 120, storage system 131, storage system 132, and system 141 are representative of any programmable electronic device or combination of programmable electronic devices capable of executing machine-readable program instructions and communicating with a user of server 120 via network 110. System 102, server 120, storage system 131, storage system 132, and system 141 may include components, as depicted and described in further detail with respect to FIG. 5, in accordance with embodiments of the present invention.

In some embodiments, network 110 may also connect instances of one or more elements of distributed computing environment 100 to other instances of one or more elements of distributed computing environment 100 within a physical location and/or among elements of other physical locations. In another embodiment, network 110 enables system 102 and/or system 141 to communicate with another computing system (not shown) to access information and computer programs that enable various aspects of the present invention. In one example, network 110 enables system 102 to access a cloud computing system that includes various analytical and modeling capabilities that are offered via an "as-a-service" model. In another example, network 110 enables a service representative (rep) to utilize UI 142 and system 141 to access a computer system of a manufacturer of storage system 131 to obtain a service manual and/or a firmware upgrade for storage system 131.

Network 110 can be, for example: a local area network (LAN); a telecommunications network; a wireless local area network (WLAN); such as an intranet; a wide area network (WAN); such as the Internet; or any combination of the previous and can include wired, wireless, or fiber optic connections. In general, network 110 can be any combination of connections and protocols that will support communications between system 102, server 120, storage system 131, storage system 131, and system 141, in accordance with embodiments of the present invention. In various embodiments, network 110 operates locally via wired, wireless, or optical connections and can be any combination of connections and protocols (e.g., personal area network (PAN), laser, infrared, ultrasonic, etc.). In an example, network 110 may support a voice over Internet protocol (VoIP) or a video chat service that enables an administrator of storage system 131 to talk to or video conference with a service rep of logistical support 140. In some embodiments, an instance of network 110 is a virtual LAN (VLAN) that connects two or more virtualized entities within a virtualized portion (not shown) of distributed computing environment 100.

System 102 includes: storage 103, analytics suite 109, analysis and response (AAR) program 200, logistics and service (LAS) program 300, and modeling program 400. In some embodiments, system 102 also includes a user interface (UI) (not shown) that enables personnel that build, support, and/or service storage systems to utilize various aspects of system 102 to support and manage a plurality of storage systems distributed among various geographic locations. The UI of system 102 also enables communication with various instances of logistical support 140 and one or more service reps. In various embodiments, system 102 can access one or more programs, functions, and/or software services from another computing system (not shown) via network 110. In one example, system 102 accesses, via network 110, a cloud service provider that provides one or more other software applications, such as analytics, cognitive, and/or machine learning programs as a Software-as-a-Service (SaaS) offering. In another example, system 102 communicates with another computing system (not shown) to obtain information and data that affects the servicing of a storage system, such as travel conditions (e.g., weather, traffic, airline availability, etc.), travel/shipping costs, etc.

Storage 103 includes database system 104, aggregated data 105, metrics 106, models 107, and information 108. In addition, storage 103 also includes an operating system of system 102, one or more software applications and/or file systems (not shown) utilized by various embodiments of the present invention. For example, storage 103 includes, but is not limited to: a communication program, an office productivity suite, a software compiler, etc.

In one embodiment, database system 104 is a relational database system utilized to process structured data associated with one or more storage system. In another embodiment, database system 104 is a graph database system that utilizes graph structures to process semantic queries. Semantic queries can generate answers (e.g., results) to fuzzy and incompletely defined questions via pattern matching and digital reasoning. Another aspect of semantic queries is that the queries process actual relationships between data and infer results from a network of data. In various embodiments, database system 104 is representative of a combination of various types of database systems. Database system 104 also includes a plurality of tables and databases utilized to store and organize data utilized to practice the present invention.

Aggregated data 105 can include both structured and unstructured data associated with storage systems. Aggregated data 105 may include sets of data that differ between locations that includes at least one storage system, based on an instance of metrics 126 of a server 120 corresponding to each location. Some data within aggregated data 105 is raw data. Other data within aggregated data 105 is filtered data and/or the results output by one or more aspects of analytics suite 109. In one embodiment, aggregated data 105 includes operational data and environmental factors from a plurality of storage systems operating within different physical and geographic locations. In some embodiments, various portions of aggregated data 105 are organized based on interrelated tables, such as within a relational database. In other embodiments, other portions of aggregated data 105 are organized based on another types of data structure, such as graph structures. In various embodiments, aggregated data 105 also includes metadata, such as information that describes relationships among data utilized to create cross-references and/or links among various types and structures of data.

Aggregated data 105 includes a list comprising: a location, an ID (e.g., a serial number), configuration information, included components and assemblies, product specification, etc. for each deployed instance of a storage system. Aggregated data 105 includes: service item information, such as serial numbers, manufacturers, and costs of parts and assemblies within a storage system and/or used to repair a storage system; data output by one or more sensors of a storage system; environmental factors identified by a storage system; system log files of a storage system; etc. Aggregated data 105 also includes: a history of service of a storage system, such as notes of a service rep, version information of firmware installed on a storage system, cycle of parts that are repair items replaced during a service call of a storage system, etc. Aggregated data 105 may also include the results of root-cause analysis associated with the debug and service of a storage system and the analysis of failed parts, components and/or assemblies replaced during the service of the storage system.

In one embodiment, metrics 106 identifies a set of data that is collected for a plurality of storage systems within each physical location (e.g., data center) that includes one or more storage systems. In some embodiments, metrics 106 is the set of data that is stored within aggregated data 105 and utilized by a global model associated with a storage system. Metrics 106 may also identify the sets of data utilized by local models and individual models associated with a storage system, which is utilized on a periodic basis to verify the models. In various embodiments, metrics 106 differs from metrics 126 of server 120. In other embodiments, metrics 106 includes general information about a location and a storage system within the location. Metrics 106 includes: service-level agreement for a user and/or location of a storage system; a level of availability of a storage system; a utilization (e.g., runtime hours, patterns of use, etc.) of a storage system; the environmental specifications (e.g., temperature, humidity, cleanliness, vibration stability, quality of electrical power, etc.) of a location of a storage system; etc. In addition, metrics 106 includes a history of models utilized to predict service of a storage system and the accuracy and timeliness of each predicted service.

Models 107 includes models associated with storage systems that predict whether a storage system requires service. Models within models 107 can range from simple analyses and decisions, such as a statistical process control (SPC) limit with a hierarchy of responses for one operational parameter, to complex graph workloads that analyze a plurality of data from a storage system utilizing an intricate web of relationships and interactions. In response to predicting that a storage system requires service, some models can generate a variety of responses, such as various notifications and a set of pre-service activities. In an example, if minimizing service interruptions are a constraint as opposed to cost, then a model may schedule both critical and non-critical predicted repairs/services within one service call. In another example, a model identifies that in response to delaying service until a specific date, the model determines a new set of operational parameters and reduces the storage capacity of the storage system to avoid stressing a failing portion of the storage system until a dictated date service.

In one embodiment, models 107 includes a plurality of models associated with one or more product specifications of storage systems, various storage system configurations, etc. Models 107 may differentiate models associated with a storage system based on general characteristics, such as global models, local models, and individual models. A global model associated with a storage system may correspond to the plurality of instances of storage systems of a product type that have been manufactured and deployed within multiple physical locations, such as within a country, across a continent, or distributed worldwide. A local model associated with a storage system may correspond to a set of storage systems within one physical location that are similarly configured. An individual model associated with a storage system may correspond to a single instance of a storage system. Each type of model associated with a storage system may include metadata WFs that are specific to each model.

In some embodiments, models 107 includes: sub-models that describe and predict the reactions and/or responses of various parts, assemblies, electronic components, etc. of a storage system, or common to multiple storage systems, to the conditions experienced by the storage system, such as a rate of wear of a component of a manufacturer based on temperature, humidity, and speed of operation; or a rate of failure of electronic components based on voltage fluctuations and/or spikes associated with the electrical power that suppliers the storage system. Models 107 may also include ancillary models associated with logistics as opposed to service.

In an embodiment, information 108 includes: information related to each physical location of a storage system and/or instance of logistical support 140, such as weather patterns, shipping/receiving capabilities, accesses/transportation modes (e.g., highways, airports, railways, etc.), hours of operation, phone numbers, e-mail addresses, contact information, etc. Information 108 may also include information about each service rep, such as an e-mail address, a cell phone number, a "home" location, a current location, a list of storage systems that the rep is trained to service, a calendar, an itinerary, etc.

In some embodiments, information 108 includes: information associated with a plurality of locations, replication information and dictates for each user (e.g., customer) that stores data within a storage system, quality of service information, such as data availability, storage system uptime of each customer, etc. In addition, information 108 may also include a grid, a table, or a database of information for each customer that stores data within a plurality of storage systems. The information associated with each customer may include: an ID for each storage media, a level of criticalness of stored data, a storage duration of the data for information lifecycle management, each location that stores a replica of the data, etc.

Analytics suite 109 includes, but is not limited to: analytic functions, cognitive functions (e.g., image recognition, natural language processing, etc.), visualization programs, inferential reasoning programs, statistical analysis programs, a contextual analysis program, a database query generator, etc. In an example, analytics suite 109 includes a visualization program, such as Visual Insights, that enables a product engineer to obtain a visual depiction of a model to improve the understanding of the relationships among various elements of a model.

In one embodiment, analytics suite 109 includes: various functions, techniques and algorithms to: analyze data, generate models, and/or update models. In an example, analytics suite 109 includes: support vector machines, artificial neural networks, naïve Bayes classifiers, metaheuristic algorithms, machine learning functions, etc. In another embodiment, various aspects of analytics suite 109 augment a predictive maintenance program of a third-party to generate and update models associated with a storage system. In some embodiments, analytics suite 109 includes one or more functions that can parse and analyze model, such as a graph workload. In various embodiments, users (e.g., administrators of a storage system) can access system 102, via a UI to utilize to one or more aspects of analytics suite 109.

AAR program 200 is a program that analyzes data associated with the operational factors and environment factors of one or more storage systems and utilizes one or more models associated with a storage system to predict whether the storage system requires servicing. AAR program 200 may include other information, such a wear history of parts, a history of service of the storage system, etc. to predict service of a storage system. In an embodiment, AAR program 200 predicts maintenance or service of a storage system and generates one or more notifications based on the analyses of the data of a storage system and one or more predictions by one or more models associated with the storage system. In addition, AAR program 200 communicates a notification or a set of notifications to server 120 and/or an instance of LAS program 300. In another embodiment, if AAR program 200 determines that the data associated with operational factors and/or environment factors of a storage system deviate from a model associated with the storage system, then AAR program 200 may execute an instance of modeling program 400. In some embodiments, AAR program 200 may execute concurrently with LAS program 300 prior to and/or during service of a storage system.

LAS program 300 is a program that coordinates the logistics and service of a storage system. LAS program 300 determines the impacts to a storage system based on information within a notification or a set of notification. LAS program 300 may initiate various pre-service activities for the storage system. In addition, LAS program 300 analyzes the service of the storage system. In one embodiment, LAS program 300 executes in the background of a computing system, such as server 120 and activates in response to receiving a notification for a storage system. In another embodiment, LAS program 300 executes within a computing system of a location different from the storage system. In some embodiments, LAS program 300 may execute concurrently with AAR program 200 prior to and/or during service of a storage system.

Modeling program 400 is a program that verifies and updates a model associated with a storage system. One or more models associated with a storage system may be distributed to a location that includes an instance of the storage system. Modeling program 400 may verify and update a model utilizing various: iterative and/or recursive techniques, simulations, inputs from a user (e.g., product engineer), and/or analyses of models associated with one or more other storage systems. Modeling program 400 may analyze data and verify, in parallel, multiple models associated with a storage system and/or a group of storage system. In one embodiment, modeling program 400 verifies and updates a model created by an engineer, product designer, or service rep of a storage system. In another embodiment, modeling program 400 retrieves one or more models associated with a storage system on a periodic basis to verify, offline, the models associated with the storage based on data associated with the storage system. In some scenarios, modeling program 400 verifies a model associated with a storage system based on data of a plurality of instances of the storage system, such as aggregated data 105. In other scenarios, modeling program 400 verifies a model associated with a storage system based on data of one or more instances of the storage system within data 125 of a location.

In some embodiments, modeling program 400 interactively updates and/or generates additional models in response to interacting with an engineer, product designer, or service rep of a storage system. In various embodiments, modeling program 400 initiates in response to an instance of AAR program 200 determining that data associated with a storage system deviates from a model associated with the storage system. In some scenarios, modeling program 400 utilizes graph structures to describe a model associated with a storage system. Modeling program 400 utilizes one or more graph workloads and/or other Big-data techniques to analyze the data associated with the storage system. In other scenarios, modeling program 400 utilizes various simulation techniques to verify a model associated with a storage system. Modeling program 400 utilizes various mathematical, statistical, knowledge-based (e.g., cognitive) techniques to update the model associated with the storage system.

Server 120 can include: user interface (UI) 122, data 125, metrics 126, models 127, and information 128. Server 120 also includes various programs and files (not shown). Examples of types of programs that server 120 can include are: a web browser; a file manager; VoIP software; various system and network administrative functions for a data processing location, such as an information lifecycle management program; and an office productivity suite of programs (e.g., a word processor, a graphics program, an e-mail client, etc.) (not shown). In addition, server 120 may also include local instances of AAR program 200 and LAS program 300 (not shown) that are utilized to analyze and respond to data related to storage systems 131 and 132 in near real-time.

In one embodiment, server 120 is a computing system within a location (e.g., data center) that supports and monitors one or more instances of storage systems 131 and 132. In another embodiment, server 120 is included within a larger storage system (not shown), such as a tape storage library. In an example, server 120 virtualizes a tape storage library into at least storage systems 131 and/or 132. In some embodiments, server 120 includes sufficient computing resources to enable local instances of analytics suite 109 and/or modeling program 400 to analyze data within data 125 for storage system 131 and storage system 132, utilizing metrics 126, models 127, and information 128. Server 120 may also initiate various pre-service activities within storage systems 131 and 132 and/or communicate various notifications and/or pre-services activities to the personnel that administer and support storage systems 131 and 132.

In other embodiments, server 120 communicates with another computing system within distributed computing environment 100. In one scenario, server 120 uploads data from at least data 125, on a periodic basis, to system 102. In another scenario, server 120 communicates with system 102 based on system 102 initiating a communication. In some scenarios, server 120 receives information, such as a notification of service, an updated model, customer information (e.g., replication schedules, replication locations, etc.). In other scenarios, server 120 communicates with system 102 based on server 120 identifying a triggering event, such as detecting an indication within a log file entry of a fault or error; the analysis of data of a storage system; an administrator of storage system 131 and 132 initiates communication; etc. In various scenarios, server 120 communicates with an instance of system 141 within a respective instance of logistical support 140, such as warning a service group of a triggering event identified by a local instance of AAR program 200 and/or diagnostics within a storage system. In various embodiments, server 120 can access one or more programs, functions, and/or software services from another computing system (not shown) via network 110. In an example, server 120 accesses a website of priority courier service to obtain a status of parts for a repair service.

In one embodiment, UI 122 may be a graphical user interface (GUI) or a web user interface (WUI). UI 122 can display text, documents, graphs, user options, application interfaces, and instructions for operation; and include the information, such as graphics, text, and/or sounds that a program presents to a user (e.g., an administrator of a data center). In addition, UI 122 can control actions that the user employs to respond and/or to communicate with: one or more executing programs, such as a local instance of AAR program 200; one or more computing systems; one or more storage systems; one or more service groups/reps via UI 142; etc. In some embodiments, a user of server 120 can interact with UI 122 via a singular device, such as a touch screen (e.g., display) that performs both input to a GUI/WUI, and as an output device presenting a plurality of icons associated with apps and/or images depicting one or more executing applications. In other embodiments, an application (e.g., a web browser, VoIP software) can generate UI 122 operating within the GUI environment of server 120.

Data 125 includes operational and functional data of one or more storage systems within distributed computing environment 100. Data 125 may include both structured and unstructured data. Some data within data 125 is raw data and other data is parsed, filtered and/or analyzed by one or more analytic programs, such as utilizing various aspects of analytics suite 109 of system 102. Data within data 125 may be similarly structured to the data of aggregated data 105 of system 102. Data collected from storage systems 131 and 132 is based on sets of data identified within metrics 126; the collection of additional data may be dictated by metrics 106. In one embodiment, some data within data 125 is real-time data that is filtered prior to storing the data. In another embodiment, operational data, sensor data, system logs, and environmental data of storage systems 131 and 132 of data 125 is uploaded, on a periodic basis, to system 102. In some embodiments, data 125 includes results of analyses of aggregated data 105 that is communicated from system 102.

In one embodiment, metrics 126 identifies a set of data collected for each storage system within a location (e.g., data center). In some embodiments, metrics 126 identifies the set of data that is stored within data 125 and utilized by local models and individual models associated with a storage system. In other embodiments, metrics 126 includes general information about a location and the storage systems within the location. Metrics 126 may include: a set of environmental specifications of a location, a service-level agreement for each customer, a level of availability of each storage system, utilization information (e.g., runtime hours, patterns of use, etc.) of each storage system, a history of models utilized to predict service of each storage system, and a record of the accuracy and timeliness of each predicted service of a storage system.

Models 127 includes a subset of the models associated with models 107 of system 102. Models 127 includes the local and individual models associated with storage systems of a location. In addition, models 127 includes ancillary models and sub-models that are utilized by models associated with a storage system. These ancillary models and sub-models may be customized to a location. Models 127 may include one or more temporary models based on one or more changes to a storage system, or utilized during the debug (e.g., diagnosing) and service of a storage system. Models 127 may include more than one model for each storage system. In some embodiments, models within models 127 are updated by a local instance of modeling program 400. In other embodiments, models associated with a storage system within models 127 are updated based on server 120 receiving one or more updated models associated with a storage system from system 102 and/or modeling program 400.

Information 128 includes information associated with replication information and dictates for each user (e.g., customer) that stores data within a storage system of a location; quality of service information, such as data availability and storage system uptime of each customer; etc. Information 128 also includes: a list of IDs for each storage media that stores data for a customer, a level of criticalness of stored data, storage duration and data retention criteria utilized by an information lifecycle management (ILM) system (not shown), each location that stores a replica of the data, etc. In addition, information 128 may also include a grid, a table, or a database of information for each customer that stores data within a storage system of the location. The information associated with stored data may identify one or more other locations that store replication of the data of the customer.

In an embodiment, information 128 also includes information related to a physical location of a storage system, such as phone numbers, e-mail addresses, and contact information of: customers, administrators of the location, service reps of the storage system of the location; hours of operation of a location; etc. In another embodiment, information 128 includes information associated with one or more storage systems of a location, such as one or more logs of service notifications, service manuals, a history of service of each storage system, operational parameters of a storage system, comments/warning messages, firmware version information, etc.

Storage system 131 and storage system 132 are storage systems that are utilized for: data backup, online archival storage, tertiary storage within tiered storage solution, long-term data storage, and/or disaster recovery. The media utilized by storage system 131 and storage system 132 is selected based on cost and storage density. In one embodiment, storage system 131 and/or storage system 132 are storage systems that utilize magnetic media, such as magnetic tape packaged within cassettes or cartridges (e.g., standard form-factor linear tape-open (LTO™) cartridges). In another embodiment, storage system 131 and/or storage system 132 are storage systems (e.g., optical jukeboxes) that utilize another type of lower-cost, persistent storage media, such as compact disks (CDs), a digital versatile disk (DVD), or other media that stores data optically as opposed to magnetically.

Storage system 131 and storage system 132 may represent individual storage units, portions of a tape library, different tape libraries, or an element of a storage area network (SAN). Storage systems 131 and 132 include various sensors and components (not shown) that obtain data related to environmental factors, such as runtime hours, temperature, humidity, vibration; and operational factors, such as a number of retry attempts, changes to speeds of operations, consumptions of power by various components/assemblies, patterns of movement and positions of various components/ assemblies during the operation of a storage system, etc. Storage systems 131 and 132 may also include firmware and/or diagnostic features (not shown) that identify and flag occurrences of various out-of-spec conditions and events (e.g., faults). In an embodiment, storage systems 131 and 132 are physically connected, such as via an overhead shuttle system, that can transfer magnetic tapes, herein referred to as storage media, between storage systems 131 and 132.

In some embodiments, one or more instance of storage system 131 and/or storage system 132 are included within a location (e.g., a data center). In other embodiments, one or more instance of storage system 131 are included within a first location and one or more instance of storage system 132 are included within a second location. In an example, storage systems 131 and 132 represent two instances of the same storage system within the same location. In various embodiments, storage system 131 represents a storage system that differs from storage system 132 based on such factors as: manufacturer, make, configuration (e.g., installed sub-systems, firmware, etc.), etc. In a further embodiment, storage system 131 and/or storage system 132 include sufficient computing resources (e.g., computing hardware) to include an instance of server 120 within the storage system.

Logistical support 140 includes at least system 141 and UI 142. UI 142 includes similar capabilities to capabilities previously discussed with respect to UI 122. Some instances of logistical support 140 include parts 145. Different instances of logistical support 140 may include a different inventory of items, within respective instances of parts 145, utilized to service a storage system. In one embodiment, an instance of logistical support 140 is included at the site (e.g., data center, backup location, etc.) that includes storage systems 131 and 132. In another embodiment, logistical support 140 is a warehouse or a parts depot (e.g., parts 145) for items utilized to service at least storage systems 131 and 132. In some scenarios, logistical support 140 includes (e.g., is staffed by) one or more service reps or other personnel that are trained to service a storage system, such as storage systems 131 and/or 132. In other scenarios, logistical support 140 is representative of a service rep, field engineer, customer service agent, product engineer, etc. that operates and/or travels from a location that does not include parts 145.

In some embodiments, logistical support 140 is representative of: a service department, a service hub, a field service office, a product support center, a parts depot, etc. that provides support for at least storage systems 131 and 132. In another example, a product engineer, within logistical support 140, utilizes an instance of UI 142 to create and/or modify metadata, relationships and/or WFs associated with a model (e.g., a graph workload) for a storage system. Alternatively, a product engineer, within logistical support 140, utilizes an instance of UI 142 to dictate the execution of an instance of modeling program 400 to automatically: modify metadata, update relationships, and/or modify WFs associated with a model associated with a storage system.

System 141 may also be: a personal digital assistant (PDA), a smart phone, a wearable device (e.g., smart glasses, a smart watch, etc.), or any programmable computer system known in the art. System 141 receives service notifications and/or repair item (e.g., parts) information from system 102 and/or server 120. System 141 may also include various programs and data, such as a web browser, a VoIP program, an e-mail client, manuals and documentation for various storage systems, etc. In one embodiment, system 141 is a computing system, such as a laptop computer or smartphone, that communicates information (e.g., suggested repair items of a service notification, notification of service severity, information associated with a location of service, etc.) associated with an instance of a storage system requires servicing to a service rep via UI 142. In another embodiment, system 141 is a computer system that includes software, such as warehousing or enterprise resource planning (ERP) software (not shown) that controls and ships repair items from parts 145 to a location that includes an instance of a storage system that requires services. In a further embodiment, system 141 is representative of an instance of system 102, such as within a product engineering and support center.

In some embodiments, system 141 is a computing system of a delivery service (not shown) that ships and tracks items of parts 145 that are utilized to service an instance of a storage system, such as storage system 132. In various embodiments, different instances of system 141 communicate with system 102, server 120, a service rep, etc. via network 110 to determine locations and delivery details of repair items (e.g., replacement parts) for a storage system. In addition, system 141 may communicate with system 102 and another computing system (not shown) to obtain data, such as weather data, traffic data, air travel data, transportation costs, etc. that affects the delivery of repair items from an instance of logistical support 140 and/or scheduling of service rep to a location of a storage system associated with a service notification.

Parts 145 includes items to repair and service a storage system. Parts 145 can include: mechanical parts and assemblies, optical parts and assemblies, electronic parts and assemblies, computer parts and assemblies, field-replaceable units (FRUs), a tool kit of a service rep, etc. Parts 145 may also include items for preventive maintenance of a storage system, such as cleaning supplies; lubricants; gauges, indicators, and/or alignment tools; and/or test equipment.

In one embodiment, interactions 150 are representative of transportation, such as the shipping/receiving of items of service (e.g., repair parts), for a storage system or travel associated with a service rep to a location of a storage system to be serviced. In another embodiment, interactions 150 represents the debug, service, and/or repair of a storage system. In some embodiments, interactions 150 represents the physical movement of storage media within a location, such as a data center. In some scenarios, interactions 150 represents manual intervention by personnel of a location (e.g., a data center) to move storage media among instances of storage system 131 and/or instances of storage system 132. In other scenarios, interactions 150 represents automated movement of one or more storage media (e.g., LTO™ tapes), such as a device that transports LTO™ tapes between an instances of storage system 131 via overhead shuttle connections. In other embodiments, interactions 150 are representative of electronic/digital interactions, such as replicating one or more tapes within a location and/or between different geographic locations.

Figure 2:
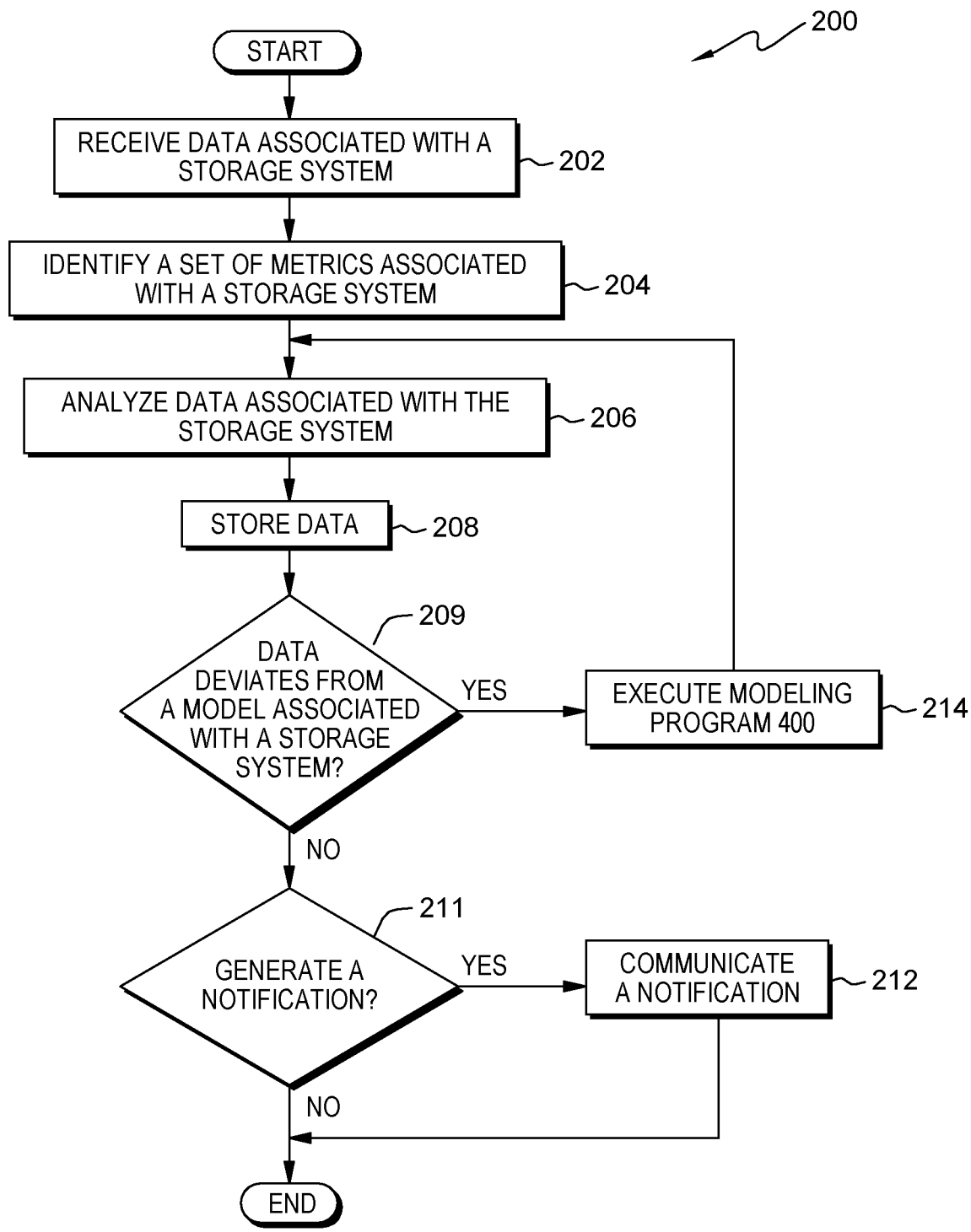
FIG. 2 depicts a flowchart of the operational steps of an analysis and response (AAR) program executing, in accordance with an embodiment of the present invention.

FIG. 2 is a flowchart depicting operational steps for AAR program 200, a program for analyzing data associated with the operational factors and environment factors of one or more storage systems to predict whether a storage system requires servicing, in accordance with embodiments of the present invention. In addition, AAR program 200 may initiate and/or interface with an instance of LAS program 300 and/or modeling program 400.

In step 202, AAR program 200 receives data associated with a storage system. In one embodiment, AAR program 200 receives data associated with a storage system uploaded from data 125 of server 120 to system 102. In some scenarios, AAR program 200 receives uploaded data associated with a storage system on a periodic basis. In other scenarios, AAR program 200 receives uploaded data associated with a storage system in near real time. In various scenarios, AAR program 200 receives uploaded data associated with a storage system based on a storage system communicating one or more triggers and/or events, such as an out-of-spec environmental factor to server 120. In another embodiment, AAR program 200 receives data associated with a storage system directly from the storage system. In some embodiments, an instance of AAR program 200 executes within server 120 and AAR program 200 obtains data from data 125 and/or a storage system (e.g., storage system 131). In other embodiments, AAR program 200 receives data associated with a storage system that is based in information input by an administrator of the storage system via UI 122 of server 120. In an example, AAR program 200 generates one or more notifications that include schedules of preventive maintenance and a predicted service for a storage system. An administrator of the storage system may indicate to AAR program 200 that the storage system can be shut down for an extended period and that the administrator prefers that multiple service items are to be completed within one service call.

In a further embodiment, an instance of AAR program 200 receives data associated with a storage system generated by: one or more diagnostic functions, routines, tests performed by a service rep; information related to the service of a storage system; and/or analyses of the service of the storage system performed by LAS program 300 (as discussed with reference to FIG. 3, step 313). In an example, AAR program 200 receives data from a service rep that indicates that the parts and service applied to the storage system do not solve the predicted repair and/or return the storage system to an operational state that meets operational/design specifications.

In step 204, AAR program 200 identifies a set of metrics associated with a storage system. A set of metrics associated with a storage system identifies the operational and/or environmental data collected from the storage system and ancillary data related to the repair and service of the storage system utilized within a model associated with the storage system. In addition, the set of metrics associated with the storage system may also include information associated with the owners of data within the storage system and information of models associated with specific instances of the storage system. In one embodiment, AAR program 200 identifies a set of metrics included in metrics 106 that are associated with a storage system. In another embodiment, AAR program 200 identifies a set of metrics included within metrics 126 of server 120 that is associated with a storage system. In some embodiments, AAR program 200 obtains multiple sets of metrics associated with a storage system. In an example, AAR program 200 determines that metrics 126 includes respective metrics for storage system 131 and storage system 132 for one physical location, and a second set of metrics within metrics 106 that apply globally to each instance of storage system 131, irrespective of geographic location.

In step 206, AAR program 200 analyzes data associated with the storage system. AAR program 200 may utilize various aspects of analytics suite 109 to analyze and/or filter data associated with the storage system. In one embodiment, AAR program 200 utilizes various aspects of analytics suite 109 to analyze data of the storage system uploaded by server 120. In some scenarios, AAR program 200 analyzes, on a periodic basis, the data of the storage system that is within aggregated data 105. In other scenarios, AAR program 200 analyzes data associated with the storage system based on dictates input by an administrator of the storage system, such as a product or design engineer. In some embodiments, AAR program 200 analyzes data associated with the storage system utilizing one or more functions and/or programs available via network 110. In another embodiment, an instance of AAR program 200 executing on server 120 communicates with system 102 to utilize one or more aspects of analytics suite 109 to analyze data associated with the storage system.

In various embodiments, AAR program 200 analyzes data associated with the storage system by comparing a portion of the received data from the storage system to the predicted (e.g., modelled) results associated with one or more other portions of the received data. In an example, AAR program 200 filters (e.g., analyzes) the received data of storage system 131 to determine the speed of operation of various server motors within storage system 131. If AAR program 200 determines that the various server motors are running within a specified speed range, then AAR program 200 estimates that the current draw (e.g., amperes) for the server motors should be X+/−5%. However, if AAR program 200 determines that the current draw for the various servos is X+15%, then AAR program 200 determines that the storage system is operating at an out-of-specification (spec) condition and that further data analysis is indicated.

Still referring to step 206 in a further embodiment, AAR program 200 analyzes data associated with the storage system by generating a graph workload to process the data of the storage system utilizing a model associated with the storage system based on a graph structure and corresponding metadata. In an alternative embodiment, AAR program 200 does not reanalyze data associated with the storage system. Instead, AAR program 200 utilizes the analyses of data, associated with a storage system, generated by modeling program 400 (discussed in further detail with respect to step 404 of modeling program 400).

In step 208, AAR program 200 stores data. In one embodiment, AAR program 200 stores the results of the analyzed data within persistent storage (e.g., storage 103) and/or in-memory storage for subsequent input to one or more models associated with a storage system. AAR program 200 may store the results of sub-optimal models or archived models separate from active models and data. In another embodiment, AAR program 200 stores the raw data (e.g., unanalyzed data) distributed within aggregated data 105. In some embodiments, AAR program 200 stores one or more results of the analyses of the received data, such as one or more notification flags and/or results of: a graph workload, spectral clustering, frequency distributions, SPC analyses, pattern matching, etc. In other embodiments, an instance of AAR program 200 executing within server 120 can store data within persistent storage (not shown) of server 120. In various embodiments, AAR program 200 downloads results of the analyzed data to: data 125, metrics 126, and/or information 128 of server 120. The downloaded data may include updated control parameters and setting for a storage system, updated SCP values for operation data of the storage system, and additional operational/environmental factors to be monitored, etc.

In decision step 209, AAR program 200 determines whether data deviates from a model associated with a storage system. In one embodiment, AAR program 200 determines that the received and/or analyzed data deviates from a model associated with a storage system based on information determined from analyzing data associated with the storage system in step 206. In another embodiment, AAR program 200 determines that data deviates from a model associated with a storage system based on processing the data associated with the storage system utilizing one or more models associated with the storage system. In some embodiments, AAR program 200 determines that data deviates from a model associated with a storage system based on identifying one or more: conditions, events, system log entries, user/service rep messages, etc. that are not included in the model.

In a further embodiment, AAR program 200 determines that a storage system is described by two or more models, such as a global model, a local model, and/or an instance of a specific model associated with the storage system; and that the data deviates from some models associated with the storage system but does not deviate from other models associated with the storage system. In response, AAR program 200 initiates another instance of AAR program 200. One instance of AAR program 200 responds to at least one model associated with data deviates from the at least one model, and another instance of AAR program 200 responds to the one or more other models associated with data that does not deviate from the one or more other models.

In response to determining that data deviates from a model associated with a storage system (Yes branch, decision step 209), AAR program 200 executes modeling program 400 (step 214).

Figure 4:
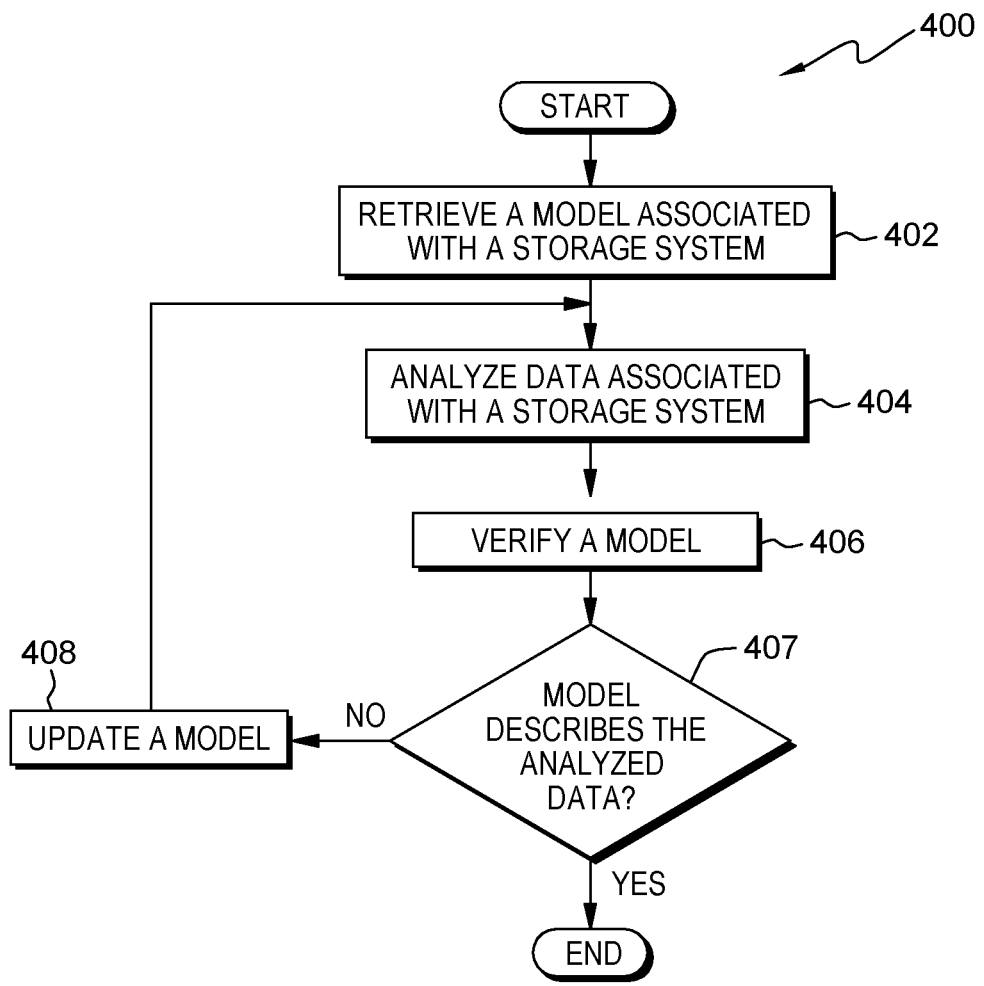
FIG. 4 depicts a flowchart of the operational steps of a modeling program, in accordance with an embodiment of the present invention.

In step 214, AAR program 200 executes modeling program 400 (described in further detail with regard to FIG. 4). AAR program 200 indicates to modeling program 400 the data and the at least one model associated with the data that deviates from the model. In one embodiment, AAR program 200 pauses until modeling program 400 responds with an indication that the model associated with data that deviates from the model is updated. In another embodiment, AAR program 200 pauses until modeling program 400 responds with an indication that a different set of data is subsequently analyzed by AAR program 200. In an example, AAR program 200 receives a message from a product engineer to: change a time period associated with the analyses of data of the storage system, exclude one or more periods of time associated with the analyses of data of the storage system, and/or modify the filtering of data associated with the analyses of data of the storage system prior to re-analyzing the data at step 206. In response to receiving one or more indications and/or messages from modeling program 400, AAR program 200 loops to step 206.

Referring to decision step 209, in response to determining that data does not deviate from a model associated with a storage system (No branch, decision step 209), AAR program 200 determines whether to generate a notification (decision step 211).

In decision step 211, AAR program 200 determines whether to generate a notification. In one embodiment, AAR program 200 generates a notification or a set of notifications based on an output related to one or more results generated by the analyses of data associated with a storage system. In one example, AAR program 200 may generate a notification of a short-duration preventive maintenance based on determining that the increased-current condition of the servos can be remedied by a cleaning and lubrication service call. In another example, AAR program 200 may generate a higher-severity notification if the increased-current condition of the servos occurs in conjunction with increased vibrations within the storage system and system log entries that identify tape transfer-unit overshoot. In another embodiment, AAR program 200 generates a notification or a set of notifications based on dictates and information of an administrator of system 102 (e.g., a product engineer) of the storage system. In some embodiments, AAR program 200 generates a notification or a set of notifications based on information output by a model associated with a storage system utilizing data associated with the storage system, various metrics, user inputs, and information associated with the storage system. In one example, AAR program 200 utilizes a model associated with a storage system that includes various predictive, cognitive, and decision tree analyses to generate a o set of notification that includes repair action for the storage system based on historical data of a plurality of storage systems. In another example, AAR program 200 modifies the services included within a set of notifications based on input from a user, such as combining different service items within one service call.

Notifications generated by AAR program 200 may include information and/or commands that initiate one or more actions within a computing system and/or a storage system, such as automatically ordering parts via an ERP system or running a diagnostic routine on the storage system as time permits; messages and/or e-mails to an administrator of the storage system; and links and/or electronic documents, such as service manuals for the storage system. In various embodiments, AAR program 200 generates a set of notifications with different notifications for the same storage system, such as notification identifying a series of actions for an administrator of storage system 132, a notification to a service rep, a notification to an instance of logistical support 140 for items within parts 145, and a notification to a priority delivery service to obtain the items from logistical support 140 for transport to the location of storage system 132.

In other embodiments, AAR program 200 dynamically generates a set of notifications by utilizing a model associated with a storage system. In some scenarios, AAR program 200 interfaces with one or more computing systems, such as server 120 and an executing instance of LAS program 300, to track the progress of the service and an efficacy of the service of a storage system. In response, AAR program 200 generates another notification. In other scenarios, AAR program 200 interfaces with one or more computing systems (not shown), such as a tracking system of a priority delivery service (e.g., to obtain a status of items for the service of a storage system), and/or a progress of travel associated with a service rep; in response, AAR program 200 generates an updated notification (e.g., a status report).

In decision step 211, in response to determining to generate a notification (Yes branch, decision step 211), AAR program 200 communicates a notification (step 212).

In step 212, AAR program 200 communicates a notification. In one embodiment, AAR program 200 generates and communicates a notification to one or more computing systems, such as server 120 and system 141 of logistical support 140. In another embodiment, AAR program 200 communicates a notification, or copy of a notification, to an administrator of system 102 (e.g., a product engineer) indicating which storage system is predicted to require servicing and identifying aspects of the service, such as replacement parts and estimated downtime. In some embodiments, AAR program 200 communicates a set of notifications to: computing systems, storage systems, users, administrators, service reps, etc. based on the information of a notification. In other embodiments, AAR program 200 generates a notification that initiates automated responses associated with other computing systems, such as ordering items to service a storage system from logistics storage 140 or obtaining travel reservations for a service rep.

Referring to decision step 211, in response to AAR program 200 determining not to generate a notification (No branch, decision step 211), AAR program 200 terminates.

Figure 3:
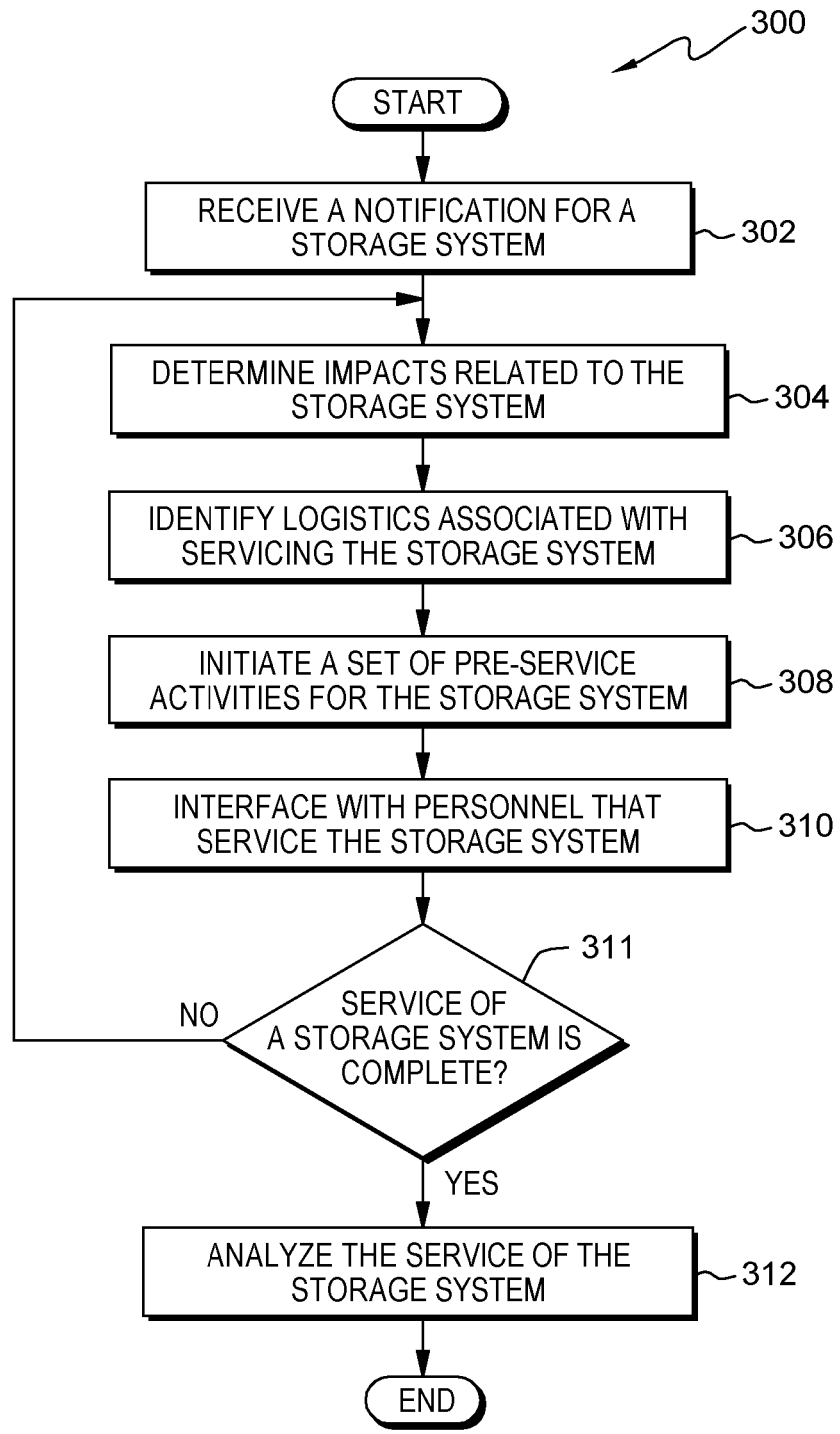
FIG. 3 depicts a flowchart of the operational steps of a logistics and service (LAS) program, in accordance with an embodiment of the present invention.

FIG. 3 is a flowchart depicting operational steps for LAS program 300, a program for assessing impacts, coordinating the logistics and service, and initiating pre-service activities of a storage system associated with a prediction of service, in accordance with embodiments of the present invention.

In step 302, LAS program 300 receives a notification for a storage system. LAS program 300 may receive a notification or a set of notifications from an instance of AAR program 200, a service rep, and/or a group/company that supports the storage system. LAS program 300 receives a notification or a set of notifications associated with a storage system that includes, but is not limited to: an indication of a prediction of service, a severity-level of a predicted service, an anticipated repair duration, a scope of service, a set of suggested pre-service activities, an identity of a service rep, a set of parameters for the storage system, etc. In one embodiment, an instance of LAS program 300, executing within server 120, receives a notification for a storage system, such as storage system 132. In another embodiment, LAS program 300 receives a notification for a storage system and LAS program 300 transfers (e.g., forwards) some of the information included within the notification to one or more user interfaces, such as UI 122 of server 120 and/or UI 142 of system 141, via network 110.

In step 304, LAS program 300 determines impacts related to the storage system. LAS program 300 determines impacts related to a prediction of service of a storage system, such as, but not limited to: a number of customers affected; an estimated downtime duration; one or more restrictions of use (e.g., operational speed, cannot utilize one or more storage units) of a storage system; etc. In one embodiment, LAS program 300 determines impacts related to a prediction of service of a storage system, based on information associated with one or more information sources. In one example, LAS program 300 determines impacts related to a prediction of service of a storage system based on information associated with: a received notification, metrics 126, one or more models associated with models 127, information 128, etc. In another example scenario, LAS program 300 determines impacts related to a prediction of service of a storage system based on information associated with: aggregated data 105, metrics 106, one or more models associated with models 107, information 108, etc. In another embodiment, LAS program 300 determines impacts related to a prediction of service of a storage system, based on results generated by a model associated with the storage system within models 127. In an example, LAS program 300 may quantify the effect of modifying the organization of storage media with respect to retrieval/mount times. In some embodiments, LAS program 300 determines impacts related to a storage system for each customer that stores data within the storage system.

In a further embodiment, LAS program 300 determines impacts related to the storage system based on the plurality of data stored within the storage system to be serviced. In an example, LAS program 300 interfaces with an information lifecycle management (ILM) program (not shown) and utilizes criteria within metrics 126 and/or information 128 to determine a disposition for each data (e.g., storage media) within the storage system. An ILM program may identify critical, frequently accessed data that can be migrated to Tier III storage (e.g., HDDs). The ILM program may identity data approaching a data retention period that can be removed from the storage system and relocated to an "inactive records storage facility" or storage media that can be moved to a portion of the storage system that will be inaccessible for the duration of the service of the storage system. In addition, the ILM program may identify a set of data (e.g., storage media) that is migrated (e.g., replicated, physically moved) to another storage system.

In step 306, LAS program 300 identifies logistics associated with servicing the storage system. In one embodiment, LAS program 300 identifies logistics associated with servicing the storage system, such as spare part availability and/or a status of a service rep, by communicating with an instance of system 141 of logistic support 140. In another embodiment, LAS program 300 identifies logistical information that affects the service of the storage system by communicating with another computing system (not shown), such as a delivery service, a travel service, weather information, etc. In some embodiments, LAS program 300 identifies logistics associated with servicing the storage system based on information included within a received notification for the storage system. In various embodiments, LAS program 300 identifies logistics associated with the plurality of data stored within the storage system to be serviced. In an example, LAS program 300 identifies the logistics associated with migrating data (e.g., storage media) from the storage system to other storage systems and/or locations based on information obtained from an ILM program, such as a set of storage media that is removed from the storage system 131, and another set of storage media that is transferred from storage system 131 to storage system 132.

In a further embodiment, LAS program 300 identifies logistics associated with servicing the storage system by utilizing one or more aspects of analytics suite 109 of server 120 to incorporate and analyze information and logistics data from a plurality of sources to determine a set of logistics and related effects based on the interactions of the information from the plurality of sources. Based on the results of the further analyses of the logistics associated with the storage system, LAS program 300 may receive one or more updated notifications. In an example, LAS program 300 determines various logistical elements and responses by utilizing aspects of analytics suite 109 to generate a graph workload for impacts and logistics related to the service of the storage system.

In step 308, LAS program 300 initiates a set of pre-service activities for the storage system. In one embodiment, LAS program 300 initiates a set of pre-service activities for the storage system, such as modifying a set of operational parameters of the storage system to enable the storage system to safely operate until the storage system is serviced. In another embodiment, LAS program 300 initiates a set of pre-service activities for the storage system based on the determined impacts related to the storage system (in step 304), such as migrating data. In an example, LAS program 300 initiates a transfer of a set of storage media from storage system 131 to storage system 132 (e.g., as represented by interactions 150), such as via an overhead shuttle or manually, by identifying the set of storage media to the personnel of the location via UI 122. In another example, LAS program 300 initiates a transfer of a set of data (e.g., replicate the data) to another storage system at a different geographic location. In some embodiments, LAS program 300 initiates a set of pre-service activities for the storage system by utilizing UI 122 to advise personnel of a location of various activities, such as verifying that parts received for the service of the storage system are correct, scheduling access to the storage system, etc.

In step 310, LAS program 300 interfaces with personnel that service the storage system. In one embodiment, LAS program 300 interfaces with the personnel that service the storage system via UI 142 to indicate a status or condition of the storage system based on the impacts, logistics, and pre-service activities determined/identified by LAS program 300. In another embodiment, LAS program 300 interfaces with personnel that service the storage system by monitoring the progress of the service. In some embodiments, LAS program 300 interfaces with the personnel that service the storage system to initiate various tests and/or diagnostics to determine the effectiveness of the repair of the storage system, such as verifying whether a set notifications correctly identified items associated with a prediction of service or whether some items of service were not predicted or were improperly predicted.

In decision step 311, LAS program 300 determines whether service of a storage system is complete. In one embodiment, LAS program 300 determines that the service of a storage system is complete based on input from a service rep via UI 122 and/or an instance of UI 142, such as from a tablet computer (e.g., system 141) of a service rep. In another embodiment, LAS program 300 determines that service of a storage system is not complete based on information input from a service rep performing the service of a storage system. In some embodiments, LAS program 300 determines that the service of a storage system is not complete based on a response from one or more diagnostic functions of the storage system. In other embodiments, LAS program 300 determines that the service of a storage system is not complete based on a set of results of one or more models associated with the storage system analyzing data generated by the serviced storage system. In an example, LAS program 300 determines that the service of a storage system is not completed based on a model determining that the storage system is not operating within specified limits and/or parameters after service and testing of the storage system. In various embodiments, LAS program 300 determines that the service of the storage system is not complete; however, at least a portion of the functionality of the storage system is restored by the service to the storage system. In an example, LAS program 300 determines, based on the input from a service rep, that the storage system can operate at a reduced speed until additional parts are received from an instance of logistical support 140 and further repairs are done.

In decision step 311, in response to LAS program 300 determining that service of a storage system is not complete (No branch, decision step 311), LAS program 300 loops to step 304 to determine impacts related to the storage system based on the status/condition of the storage system. In one embodiment, LAS program 300 loops without delay. In another embodiment, LAS program 300 loops but delays executing step 304 until LAS program 300 receives one or more new notifications from an instance of AAR program 200, based on results of: tests, diagnostics, one or more models, and/or information input by a service rep.

Referring to decision step 311, in response to determining that service of a storage system is complete (Yes branch, decision step 311), LAS program 300 analyzes the service of the storage system.

In step 312, LAS program 300 analyzes the service of the storage system. LAS program 300 may store the analyses and/or history of the service of the storage system within information 128 of server 120 and/or aggregated data 105 of system 102. In one embodiment, LAS program 300 analyzes the service of the storage system based on comparing the information associated with one or more notifications for the storage system to information input by a service rep. In an example, LAS program 300 compares the accuracy of various items of a notification, such as required repair parts, estimated service time, etc. In another embodiment, LAS program 300 analyzes the service of a storage system by: performing and/or receiving the results of one or more diagnostics, tests, verification routines, etc., of the storage system; receiving a set of information (e.g., note, forms, etc.) from a service rep for the service of the storage system; analyzing a report of an administrator of the storage system; and/or activating an instance of modeling program 400 to check a model associated with the storage system.

In some embodiments, LAS program 300 analyzes the service of the storage system by incorporating information obtained from an instance of AAR program 200 that executes in the background and analyzes data obtained from one or more diagnostics, tests, verification routines, and/or operations of the storage system. In various embodiments, in response to LAS program 300 analyzing the service of the storage system, modeling program 400 updates one or more models associated with the storage system and stores at least one updated model associated with the storage system within models 127 of server 120. In response to LAS program 300 analyzing the service of the storage system, modeling program 400 may store one or more updated models associated with the storage system within models 107 of system 102. In an example, LAS program 300 determines that parts of a different lot, engineering change (EC), and/or manufacturer are used to service the storage system. In response, modeling program 400 may update one or more models associated with the storage system based on the parts used to service the storage system.

In a further embodiment, LAS program 300 sets a conditional flag and/or pauses the analyses of the service of the storage system until additional details are obtained that are related to the service of the storage system, such as environmental data that is not obtained by sensors of the storage system and/or information related to a cause of failure of one or more components replaced during the service. In one example, LAS program 300 obtains details related to the environmental monitoring data of the location that hosts the storage system. In another example, LAS program 300 includes the root-cause analysis data, obtained from an off-site test lab, within the analyses of service of the storage system. Root-cause analysis of a failed component may indicate: a quality issue with a supplier of the failed component; that a component is more susceptible to premature failure based on environmental and/or operational conditions experienced by the storage system; and/or a failure mechanism that is not included in a model.

FIG. 4 is a flowchart depicting operational steps for modeling program 400, a program for verifying and updating a model associated with a storage system, in accordance with embodiments of the present invention. In one embodiment, modeling program 400 verifies and updates a model in response to AAR program 200 determining that data of a storage system deviates from one or more models associated with the storage system. In another embodiment, modeling program 400 verifies and updates models on a periodic basis and/or offline. In some embodiments, one or more users, such as a service rep, can dictate the execution of modeling program 400. In other embodiments, modeling program 400 tests a model associated with a storage system by including aspects or relationships of another storage system within the storage system.

In step 402, modeling program 400 retrieves a model associated with a storage system. In one embodiment, modeling program 400 retrieves a model associated with a storage system based on input from personnel associated with a storage system, such as a product engineer. In one example, modeling program 400 retrieves a model associated with a storage system that is a new model associated with the storage system. In another example, modeling program 400 retrieves a model associated with a storage system based on request from personnel that service the storage system and/or LAS program 300 analyzing the service of the storage system, in step 312. In another embodiment, modeling program 400 retrieves a model associated with a storage system on a periodic basis to verify the model associated with the storage system. In some embodiments, modeling program 400 retrieves a model associated with a storage system in response to AAR program 200 determining that the analyzed data of a storage system deviates from the model associated with the storage system.

In various embodiments, modeling program 400 retrieves two or more models associated with a storage system to perform a comparison among the models. In an example, modeling program 400 retrieves an individual model, a local model, and a global model associated with a storage system to perform a comparison among the models. In a further embodiment, modeling program 400 retrieves one or more models associated with a storage system in response to changes related to the storage system, such as updates to metrics 106 and/or metrics 126; a deployment of a new version of firmware for the storage system, changes to parts, components, and/or assemblies within the storage system (e.g., a new supplier).

In step 404, modeling program 400 analyzes data associated with a storage system. In one embodiment, modeling program 400 utilizes the analyses of data associated with the storage system performed by AAR program 200 in step 206. In another embodiment, modeling program 400 utilizes one or more aspects of analytics suite 109, such as various mathematical, statistical, classification (e.g., keyword/string searches) algorithms to analyze the data associated with a storage system. Modeling program 400 may also utilize data processing and analysis tools of another computing system (not shown) accessible via network 110. In some embodiments, modeling program 400 analyzes data associated with a storage system within aggregated data 105. In other embodiments, modeling program 400 analyzes data associated with a storage system within data 125 of server 120.

In various embodiments, modeling program 400 utilizes: a parsing program, a contextual analysis program, and/or a cognitive program to extract and analyze data from one or more unstructured sources of data of a storage system, such as a system log. Modeling program 400 may also analyze data using spectral clustering, frequency distributions, pattern matching, etc. In a further embodiment, modeling program 400 utilizes one or more graph workloads associated with a storage system to analyze the data associated with a storage system.

In step 406, modeling program 400 verifies a model. Modeling program 400 may utilize raw data, analyzed data, filtered data, data from specified periods of time, or a combination thereof as input to a model. In addition, modeling program 400 may verify one or more models in parallel. In one embodiment, modeling program 400 verifies a model associated with a storage system based on presenting the model, one or more results of the model, and the analyzed data of the storage system to an engineer or product designer of the storage system via one or more dashboard, UIs, and/or visualization programs. Modeling program 400 pauses and awaits one or more responses, related to the model, from one or more individuals (e.g., an engineer, a product designer, etc.) that support the storage system.

In another embodiment, modeling program 400 automatically verifies a model by comparing various aspects of predictive service (i.e., maintenance) to one or more actual records of service of a storage system to determine whether the model predicts servicing the storage system based on the data associated with the storage system. In some embodiments, modeling program 400 verifies a model based on a threshold value related to the accuracy of a model as compared to the analyzed data associated with a storage system. In one example, modeling program 400 determines that root-cause analyses of replaced parts indicates that replacement was predicted (e.g., 95% accurate) and that the level of wear of the replaced parts is within a predicted range (e.g., +/−15%). In another example, modeling program 400 determines whether the SPC limits of a parameter of the aggregated data of a storage unit is optimized based on metrics and/or information of a location, such as attaining 99% availability with less than 2% false-positive predictions of service.

In other embodiments, modeling program 400 verifies an ancillary model and/or sub-model. In one scenario, modeling program 400 verifies one or more logistics-based ancillary models, such as models associated with: scheduling of service, repair tools and parts delivery, estimating a duration of a repair, etc. In another scenario, modeling program 400 verifies sub-models associated with wear-rates and/or failure rates for various components of a storage system based on various conditions that the components experience. In an example, modeling program 400 verifies sub-models associated with the rate of embrittlement of drive belts of various manufactures based on humidity within a storage system.

In decision step 407, modeling program 400 determines whether a model describes the analyzed data. In one embodiment, modeling program 400 determines that a model associated with a storage system does not describe the analyzed data of the storage system based on information generated by the storage system, such as the model did not predict a repair of a storage system. In another embodiment, modeling program 400 determines that a model associated with a storage system does not describe the analyzed data related to the service of the storage system (referring to FIG. 3, step 312), such as one or more items of a predicted service did not require service. In various embodiments, modeling program 400 determines that some models associated with a storage system describe the analyzed data and other models do not describe the analyzed data. In an example, modeling program 400 determines that a local model associated with a storage system describes the analyzed data; however, a global model associated with the storage system does not describe the analyzed data.

In a further embodiment, modeling program 400 determines that a sub-model associated with various models and storage systems does not describe the analyzed data based on data associated with items related to servicing a storage system as opposed to the storage system. In one scenario, modeling program 400 determines that a sub-model associated with a storage system does not describe the analyzed data, such as a model associated with the lifespan of a component of one or more storage systems is inaccurate based on root-cause analysis data of a various failed instance of the component. In another scenario, modeling program 400 determines that a sub-model related to servicing a storage system does not describe the analyzed data based on: a duration estimate of a repair was incorrect, parts did not arrive at the location of the storage system within a predicted time, etc.

In response to determining that a model does not describe the analyzed data (No branch, decision step 407), modeling program 400 updates a model (step 408).

In step 408, modeling program 400 updates a model. Modeling program 400 stores the updated models, with version control, to models 107 and/or to one or more locations that include an instance of the storage system. In addition, as part of an update, modeling program 400 may add and/modify one or more notifications, of a set of notifications, generated by predictions of a model. In one example, modeling program 400 updates a form-based notification, where fields within the form include results obtained by a model associated with a storage system. In another example, in response to determining a discovered relationship within the data associated with a storage system, modeling program 400 interfaces with support personnel to define a new notification and/or add one or more fields to a current notification form to include information associated with the storage system.

In one embodiment, modeling program 400 updates a model based on: inputs from a user, such as a product engineer; one or more results of analyzing data associated with a storage system; and/or information within a model associated with another storage system. In one scenario, modeling program 400 interactively updates and/or generates additional models in response to interacting with an engineer, product designer, or service rep of a storage system. In an example, modeling program 400 presents the analyzed data of a storage system and the results of a model to a user utilizing one or more aspects of analytics suite 109, such as a visualization program to depict the results and metadata (e.g., relationships, WFs, etc.) of a model based on a graph workload. In some scenarios, modeling program 400 dynamically updates the results of a graph workload-based model as the user updates one or more WFs within the model and presents the results to the user via a UI. In addition, modeling program 400 may utilize various iterative and/or recursive techniques to update a model.

In another embodiment, modeling program 400 automatically updates a graph workload-based model associated with a storage system. In one scenario, modeling program 400 utilizes one or more Big-data techniques to update a graph workload-based model associated with a storage system. In another scenario, modeling program 400 utilizes various simulation techniques to update a graph workload-based model associated with a storage system. In an example, modeling program 400 may utilize a Monte Carlo-style simulation to identify a range of WFs for the model that predicts known instances of service with respect to the aggregated data of a storage system. Modeling program 400 can subsequently generate a set of models based on various WFs within the range of WFs. Modeling program 400 verifies the updates to one or more models in step 406 to determine which WFs predict instances of service for a storage system that were not predicted by a previous model associated with the storage system. Modeling program 400 may present a selection of updates models to a user for review.

Still referring to step 408 in some embodiments, modeling program 400 utilizes various mathematical, statistical, knowledge-based (e.g., cognitive) techniques to update the model associated with the storage system. In a further embodiment, modeling program 400 utilizes one or more other aspects of analytics suite 109 to discover new and/or different relationships that occur within the aggregated data of a storage system that are not included within a model associated with the storage system. Modeling program 400 may utilize: support vector machines, artificial neural networks, naïve Bayes classifiers, metaheuristic algorithms, machine learning functions, etc. to discover a new and/or different relationships within the aggregated data. In addition, modeling program 400 may test a discovered relationship of an updated model within models associated with other storage systems to determine whether the discovered relationship is applicable to other storage systems.

In response to modeling program 400 updating one or more models associated with a storage system, modeling program 400 loops to reanalyze the data associated with the storage system and verify a new or updated model associated with the storage system (steps 404 and 406).

Referring to decision step 407, in response to determining that a model does describe the analyzed data (Yes branch, decision step 407), modeling program 400 terminates.

Figure 5:
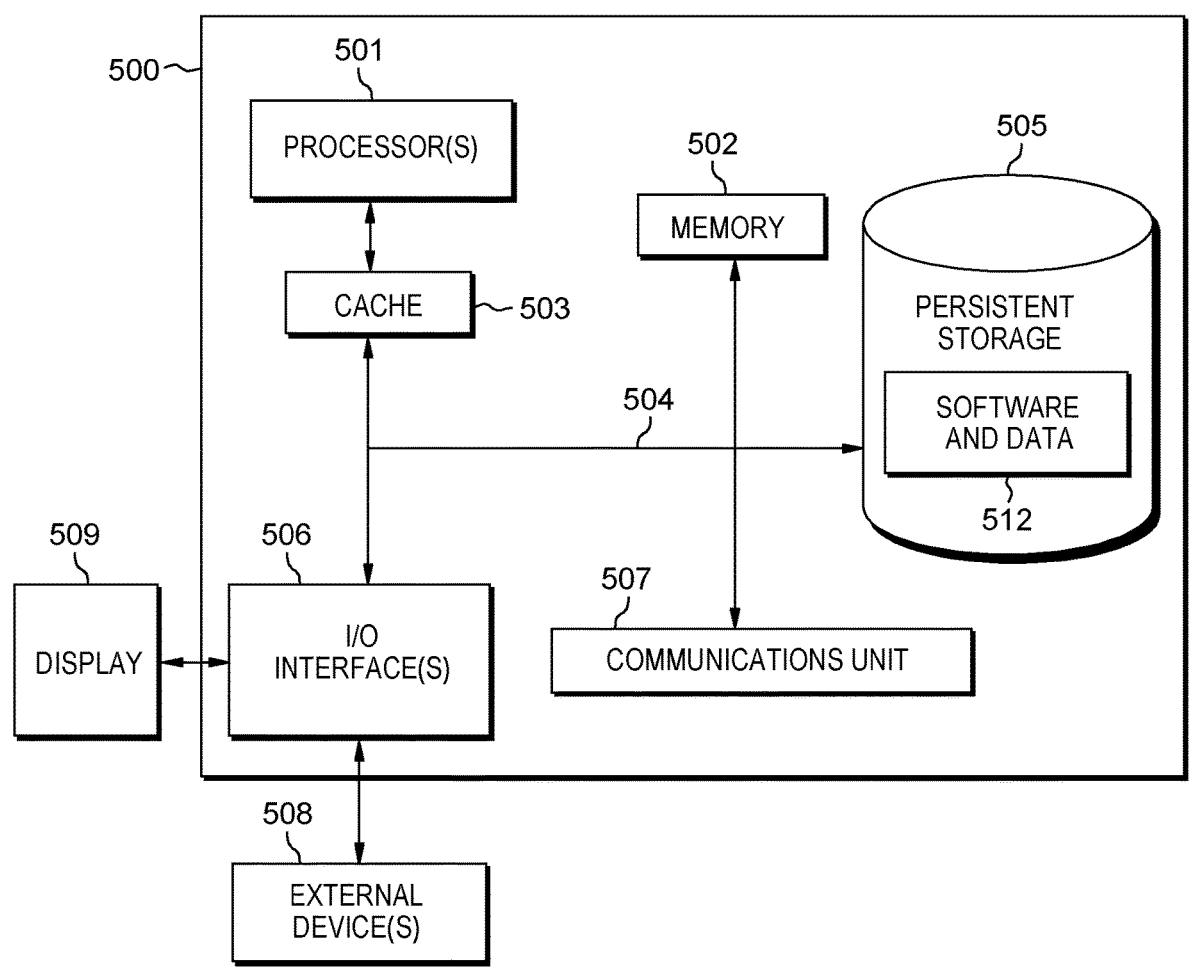
FIG. 5 is a block diagram of components of a computer, in accordance with an embodiment of the present invention.

FIG. 5 depicts a block diagram of computer system 500, which is representative of System 102, server 120, storage system 131, storage system 132, and system 141. Computer system 500 is an example of a system that includes software and data 512. Computer system 500 includes processor(s) 501, memory 502, cache 503, persistent storage 505, communications unit 507, 110 interface(s) 506, and communications fabric 504. Communications fabric 504 provides communications between memory 502, cache 503, persistent storage 505, communications unit 507, and 110 interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. Storage 103 of system 102 is an example of persistent storage 505.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 403 and one or more memories of memory 502. With respect to system 102, software and data 512 includes: database system 140, aggregated data 105, metrics 106, models 107, information 108, analytics suite 109, AAR program 200, LAS program 300, modeling program 400, and various other programs that are stored storage 103. With respect to server 120, software and data 512 includes: user interface 122, data 125, metrics 126, models 127, and information 128, and various other programs. Software and data 512 may also include an instance of AAR program 200, LAS program 300, and/or modeling program 400.

Communications unit 507, in these examples, provides for communications with other data processing systems or devices, including resources of system 102, server 120, storage system 131, storage system 132, and system 141. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to: an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additionally, the phrase "based on" should be interpreted to mean "based, at least in part, on."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a storage system, the method comprising:
   receiving, by one or more computer processors, environmental data and operational data associated with a storage system while the storage system is operating;
   analyzing, by one or more computer processors, the received environmental data and operational data and a plurality of aggregated data associated with the storage system while the storage system is operating utilizing a graph workload generated by one or more models associated with the storage system;
      wherein the plurality of aggregated data associated with the storage system is organized as a graph structure and the plurality of aggregated data is stored as a graph database;
      wherein the plurality of aggregated data associated with the storage system includes raw data and analyzed data;
      wherein the plurality of aggregated data within the graph database is distributed among vertices associated with a graph structure;
         wherein a vertex within the graph structure further includes key-value pair information, metadata, and edge information that links the vertex to one or more other vertices of the graph structure;
         wherein one or more vertices further include respective weight factors; and
            wherein the edge information between vertices includes relationship data, a direction, and at least one corresponding weight factor;
   determining, by one or more computer processors, whether to service the storage system based on the analyzed plurality of aggregated data and further based on the received environmental data and operational data by the graph workload generated by the one or more models associated with the storage system while the storage system is operating;
   in response determining to service the storage system, generating, by one or more computer processors, a set of notifications based, at least in part, on information from the one or more models associated with the storage system analyzing the received environmental data and operational data; and
   initiating, by one or more computer processors, one or more pre-service activities associated with the storage system based, at least in part, on information within of the set of notifications, wherein a first pre-service activity includes applying a set of modified operational parameters to the storage system.

2. The method of claim 1, wherein one or more other pre-service activities associated with the storage system are selected from the group of:
   automatically transporting a set of data stored within corresponding storage media, from the storage system to another storage system; and
   relocating a set storage media, based on one or more information lifecycle management criteria, from the storage system to an inactive records storage facility.

3. The method of claim 1, wherein the plurality of aggregated data associated with the storage system is stored within the graph database, and wherein the graph database processes sematic queries generated by one or more graph workloads.

4. A computer program product for managing a storage system, the computer program product comprising:
   one or more computer readable storage media and program instructions stored on the one or more computer readable storage media, the program instructions readable/executable by one or more computer processors:

program instructions to receive environmental data and operational data associated with a storage system while the storage system is operating;

program instructions to analyze the received environmental data and operational data and a plurality of aggregated data associated with the storage system while the storage system is operating utilizing a graph workload generated by one or more models associated with the storage system;

wherein the plurality of aggregated data associated with the storage system is organized as a graph structure and the plurality of aggregated data is stored as a graph database;

wherein the plurality of aggregated data associated with the storage system includes raw data and analyzed data;

wherein the plurality of aggregated data within the graph database is distributed among vertices associated with a graph structure;

wherein a vertex within the graph structure further includes key-value pair information, metadata, and edge information that links the vertex to one or more other vertices of the graph structure;

wherein one or more vertices further include respective weight factors; and wherein the edge information between vertices includes relationship data, a direction, and at least one corresponding weight factor;

program instructions to determining whether to service the storage system based on the analyzed plurality of aggregated data and further based on the received environmental data and operational data by the graph workload generated by the one or more models associated with the storage system while the storage system is operating;

program instructions to respond determining to service the storage system by generating a set of notifications based, at least in part, on information from the one or more models associated with the storage system analyzing the received environmental data and operational data; and program instructions to initiate one or more pre-service activities associated with the storage system based, at least in part, on information within of the set of notifications, wherein a first pre-service activity includes applying a set of modified operational parameters to the storage system.

5. The computer program product of claim 4, wherein one or more other pre-service activities associated with the storage system are selected from the group of:

automatically transporting a set of data stored within corresponding storage media, from the storage system to another storage system; and relocating a set storage media, based on one or more information lifecycle management criteria, from the storage system to an inactive records storage facility.

6. The computer program product of claim 4, wherein the plurality of aggregated data associated with the storage system is stored within the graph database, and wherein the graph database processes sematic queries generated by one or more graph workloads.

7. A computer system for managing a storage system, the computer system comprising:

one or more computer processors;

one or more computer readable storage media;

program instructions stored on the computer readable storage media for reading/execution by at least one of the one or more computer processors, the program instructions further comprising:

program instructions to receive environmental data and operational data associated with a storage system while the storage system is operating;

program instructions to analyze the received environmental data and operational data and a plurality of aggregated data associated with the storage system while the storage system is operating utilizing a graph workload generated by one or more models associated with the storage system;

wherein the plurality of aggregated data associated with the storage system is organized as a graph structure and the plurality of aggregated data is stored as a graph database;

wherein the plurality of aggregated data associated with the storage system includes raw data and analyzed data;

wherein the plurality of aggregated data within the graph database is distributed among vertices associated with a graph structure;

wherein a vertex within the graph structure further includes key-value pair information, metadata, and edge information that links the vertex to one or more other vertices of the graph structure;

wherein one or more vertices further include respective weight factors; and wherein the edge information between vertices includes relationship data, a direction, and at least one corresponding weight factor;

program instructions to determining whether to service the storage system based on the analyzed plurality of aggregated data and further based on the received environmental data and operational data by the graph workload generated by the one or more models associated with the storage system while the storage system is operating;

program instructions to respond determining to service the storage system by generating a set of notifications based, at least in part, on information from the one or more models associated with the storage system analyzing the received environmental data and operational data; and program instructions to initiate one or more pre-service activities associated with the storage system based, at least in part, on information within of the set of notifications, wherein a first pre-service activity includes applying a set of modified operational parameters to the storage system.

8. The computer system of claim 7, wherein one or more other pre-service activities associated with the storage system are selected from the group of:

automatically transporting a set of data stored within corresponding storage media, from the storage system to another storage system; and relocating a set storage media, based on one or more information lifecycle management criteria, from the storage system to an inactive records storage facility.

9. The computer system of claim 7, wherein the plurality of aggregated data associated with the storage system is stored within the graph database, and wherein the graph database processes sematic queries generated by one or more graph workloads.

10. The method of claim 1, wherein the environmental data and the operational data associated with the storage system includes monitoring data that includes temperature, humidity, speed of operation of one or more components, patterns of movement of an assembly, fluctuations associated with the electrical power supplied to the storage system.

11. The computer program product of claim 4, wherein the environmental data and the operational data associated with the storage system includes monitoring data that includes temperature, humidity, speed of operation of one or more components, patterns of movement of an assembly, fluctuations associated with the electrical power supplied to the storage system.

12. The computer system of claim 7, wherein the environmental data and the operational data associated with the storage system includes monitoring data that includes temperature, humidity, speed of operation of one or more components, patterns of movement of an assembly, fluctuations associated with the electrical power supplied to the storage system.

13. The method of claim 1, wherein a weight factor within the graph workload varies based on the received environmental data and operation data associated with the storage system, a model associated with a component of the storage system, and a set of environmental specifications for a location of the storage system.

14. The program product of claim 4, wherein a weight factor within the graph workload varies based on the received environmental data and operation data associated with the storage system, a model associated with a component of the storage system, and a set of environmental specifications for a location of the storage system.

* * * * *